Aug. 23, 1927.
F. A. KELLER
BATTERY CELL
Filed March 17, 1925
1,640,039
2 Sheets-Sheet 1
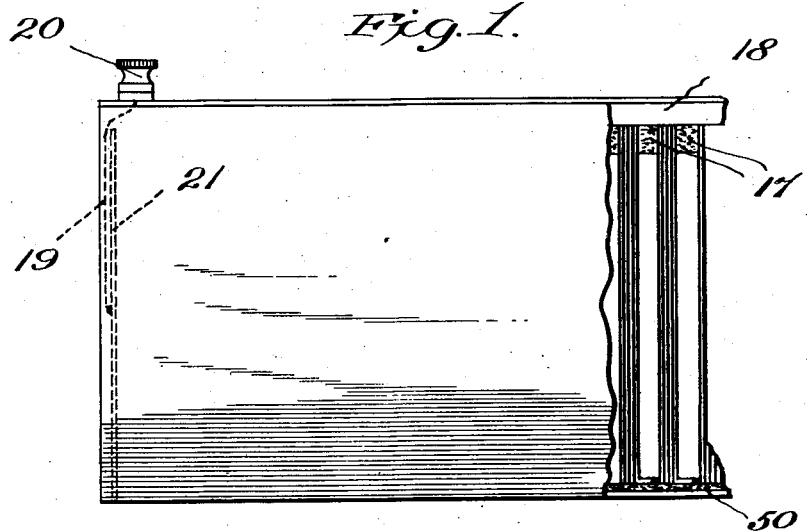
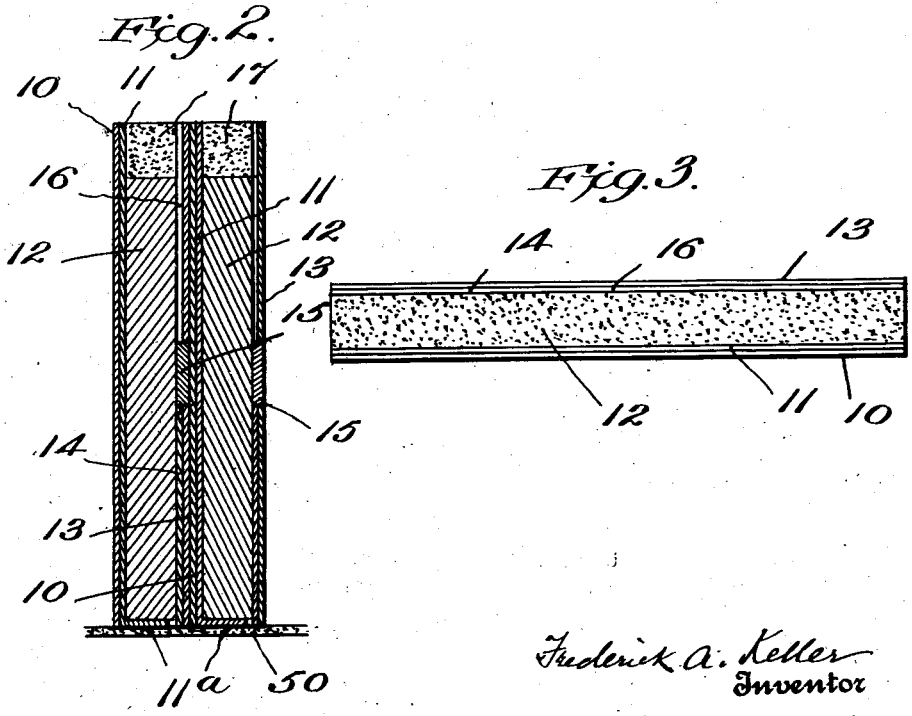
Frederick A. Keller
Inventor
By his Attorney Aug. 23, 1927.  1,640,039
F. A. KELLER
BATTERY CELL
Filed March 17, 1925    2 Sheets-Sheet 2
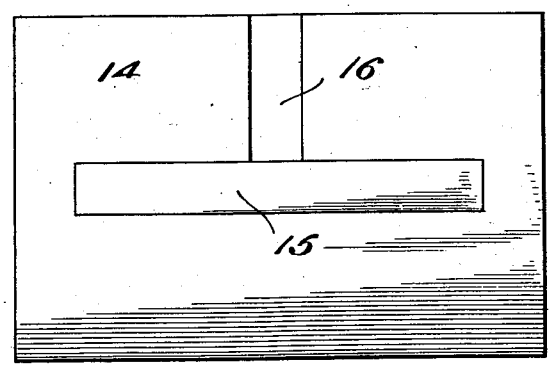
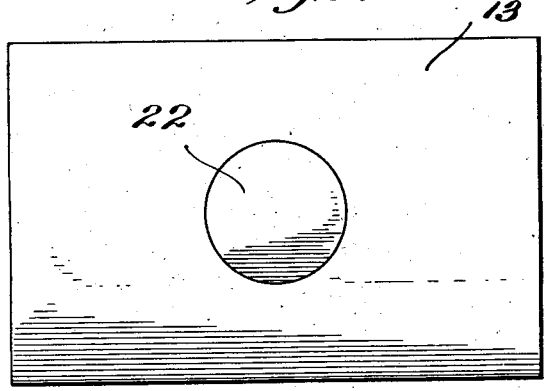
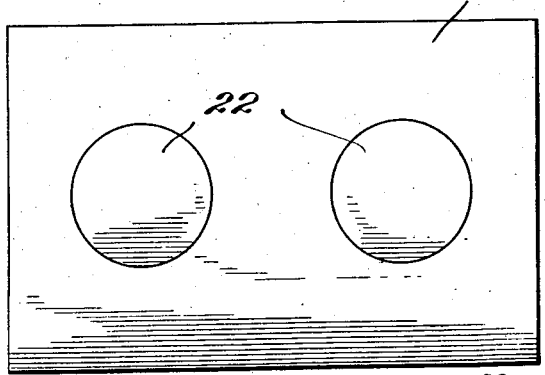
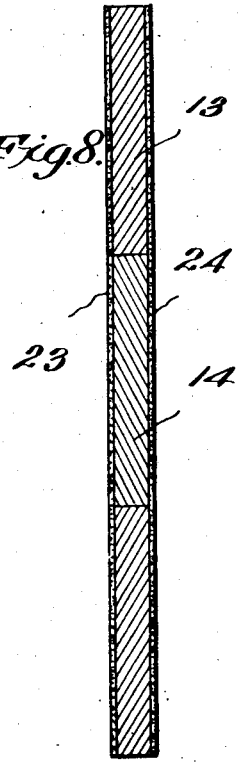
Inventor
Frederick A. Keller
By his Attorney Patented Aug. 23, 1927.

1,640,039

UNITED STATES PATENT OFFICE.

FREDERICK A. KELLER, OF NEW YORK, N. Y., ASSIGNOR TO BRIGHT STAR BATTERY COMPANY, A CORPORATION OF NEW YORK.

BATTERY CELL.

Application filed March 17, 1925. Serial No. 16,102.

The present invention has reference to an improved form of dry or semi dry electric battery.

The principal objects of the invention are the provision of a simple, cheap and easily assembled battery of high efficiency, occupying a minimum space for a given capacity, the provision of a novel and inexpensive form of cathode or positive electrode, a novel seal for batteries and the provision of a cheap and efficient form of depolarizing element for batteries of the general character described.

Certain preferred forms of the invention are illustrated in the accompanying drawings in which Figure 1 is a side elevation of one end of a complete battery with a part of one side of the battery casing removed, Figure 2 is a vertical sectional view of two of the cells as assembled in a battery, Figure 3 is a plan view of a single cell, Figure 4 is an interior face view of one form of the improved cathode or positive electrode, Figures 5 and 6 are exterior face views of modified forms of cathode, and Figures 7 and 8 are sectional views of further modified forms of cathodes.

My improved battery is composed of flat and preferably rectangular elements assembled face to face, the negative (usually zinc) electrode of each cell or element being in direct face contact with the positive or cathode of the next cell, whereby the internal resistance is reduced to a minimum.

In Figure 2, the flat negative (zinc) electrode is shown at 10. Next to this and placed flat against it is a bibulous layer 11 usually of cardboard, which is impregnated with an excitant in the usual manner. The thick layer of depolarizing mixture 12 is placed next, and against the opposite surface of this layer is placed the cathode hereinafter described.

The lower end of each bibulous layer 11 is preferably turned under the lower edge of the depolarizing layer, as shown at 11ª. This portion 11ª serves as a support to prevent the dropping off of any portion of the friable depolarizer.

The novel cathode or positive electrode, preferably used in my improved cell is composed of a flat layer (or layers) of cardboard or the like, through which extends one or more bodies of a suitable cathode material such as carbon or a carbon compound.

In the form shown in Figures 2, 3 and 4, the cathode is formed of two juxtaposed flat sheets of paraffined or otherwise waterproofed cardboard or the like insulating and non-bibulous material, shown at 13 and 14, through which passes a tightly fitting mass of cathode material 15, adapted to come into direct contact on the one hand with the adjacent layer of depolarizing mixture 12 and on the other hand with the negative electrode or zinc of the next cell. This is clearly shown in Figure 2.

In order that the gases evolved during active use of the cell may have an outlet, I prefer to provide a vent opening. This preferably takes the form of a channel 16 cut into the face of the cardboard above the cathode material 15. Where two layers of cardboard are used, as shown, one of these may be entirely cut through to form this channel. Of course this method of forming the vent channel is not essential, but it is found convenient for ease and economy of manufacture.

At the top of each cell a space is left above the depolarizer which is shorter than the other layers, and this space is occupied by sand or other small particles of inert material shown at 17. The gases escaping through the vent 16 are allowed to accumulate within the spaces between the particles 17.

In assembling the battery as a whole, sealing material is poured in and allowed to harden over the cells, as shown at 18 in Figure 1. While any well known sealing material may be used in this connection, I prefer to use melted sulphur. This material is very fluid when melted, and readily flows into the smallest cavities, thus making it possible to use cells of maximum size in a given battery.

At the bottom of the cells I employ a layer of soft pitch 50, or similar material which prevents any possibility of short circuits.

Connections are made at suitable points as desired by means of wires 19, carried down to the terminal electrodes and connected to suitable binding posts 20. At the positive end it will be found best to provide a conducting plate of suitable metal placed in contact with the terminal cathode to which the wire 19 is soldered. This plate is indicated in dotted lines in Figure 1 at 21.

In Figure 5 is shown a modified form of built up cathode, in which a circular carbon inset 22 is used. This may be a slice cut across the usual cylindrical carbons now commonly used in round cells, or may be otherwise produced.

As shown in Figure 6 a plurality of these round insets 22 may be used. Any number and shape of these insets may be used without departing from my invention.

Inasmuch as the conductivity of the depolarizing mixture is relatively low, it is desirable in some cases to extend the effective surface of contact of the cathode therewith.

In Figure 7 is shown in section a modified form of my cathode in which a layer of graphite paint or equivalent conductive material 23 is spread over one face of the board 13 and carbon inset 14, so as to adhere thereto. The layer thus produced becomes, for purposes of conductivity, a virtual extension of the carbon inset, and greatly reduces the electrical resistance on the plane of contact of the cathode with the depolarizing layer.

In Figure 8 is shown a further modification of my invention in which the conductive layer 24 (preferably graphite paint) is applied to the other side of the composite cathode, both sides being so provided.

It is clear that many changes may be made in the construction and arrangement of my cells and batteries without departing from my invention, which is not limited to the details herein shown and described.

What I claim is—

1. A composite electrode for dry battery cells comprising a thin, flat sheet of insulating material having an aperture in the same in combination with a section of active material of substantially the same thickness as the supporting sheet set into said aperture.

2. An electrode as in claim 1 wherein the active material is a thin disc of carbonaceous material.

3. An electrode as in claim 1 in combination with a conductive and adhesive layer extending over the supporting sheet and the active inset.

4. Apparatus as in claim 1 wherein the inset is made of carbanaceous material in combination with a conducting layer of graphite paint on one side of the sheet.

5. An electrode as in claim 1 wherein the inset is made of carbonaceous material and the conducting layer is applied to both sides of the sheet.

6. In a battery cell, a composite electrode comprising a supporting sheet and an inset of active electrode passing through the same, a conducting layer in contact with one face of said composite electrode, and a depolarizing layer on the other side of said conducting layer.

7. An electrode for dry battery cells comprising two perforated insulating sheets placed face to face in contact, one of said sheets being partly cut away to provide a gas vent, and a thin disc of active material fitting the perforation in said sheets and passing through both of them.

In testimony whereof I have hereto affixed my signature.

FREDERICK A. KELLER.